United States Patent [19]

Martins

[11] 3,831,719
[45] Aug. 27, 1974

[54] BRAKE WEAR COMPENSATION USING THREADED WEDGE INTERLOCK
[75] Inventor: Samuel J. Martins, Reseda, Calif.
[73] Assignee: Airheart Products, Inc., Chatsworth, Calif.
[22] Filed: Jan. 8, 1973
[21] Appl. No.: 321,708

[52] U.S. Cl............ 188/196 F, 188/71.9, 188/106 F
[51] Int. Cl............................................. F16d 65/56
[58] Field of Search............ 188/71.9, 106 F, 196 F, 188/196 BA, 79.5 GE

[56] References Cited
UNITED STATES PATENTS
3,482,657  12/1969  Zeitrager.................. 188/196 F X
3,498,423  3/1970  Belart...................... 188/196 F
3,653,470  4/1972  Travis...................... 188/196 F X
3,688,875  9/1972  De Hoff et al............. 188/71.9

Primary Examiner—Duane A. Reger
Attorney, Agent, or Firm—William W. Haefliger

[57] ABSTRACT

Brake part advancing and wear compensation apparatus includes a lever actuated anvil engaged by wedge means, there being a rotary shaft having rotary cam engagement with the wedge means. The shaft transmits braking force from the anvil and wedge means to the brake part, as via a non-rotary stem subject to retraction by an energizable Belleville spring. A torsion spring tends to rotate the shaft relative to the wedge means, maintaining tight coupling between the anvil and shaft in spite of brake part wear.

16 Claims, 3 Drawing Figures

BRAKE WEAR COMPENSATION USING THREADED WEDGE INTERLOCK

BACKGROUND OF THE INVENTION

This invention relates generally to friction braking apparatus, and more particularly concerns unusually simple and effective apparatus to compensate for disc brake wear, to effect mechanical advantage in force transmission from a pneumatic actuator to disc braking structure, especially in dual mode on a caliper, and to provide for resetting of the compensation structure when new brake lining is provided.

Many vehicle braking systems, particularly as employed on trucks and buses, use air pressure, as for example at 120 p.s.i., to displace the actuator piston for effecting braking. It has long been recognized that such systems present certain disadvantages. Among these are the relatively large size of the piston required to develop necessary braking force, the latter being a function of the product of the piston area and the air pressure. While principles of mechanical advantage may be employed to increase the braking force, the stroke of the large piston is undesirably increased when the brake lining wears, so that the required size of air actuated systems for vehicle disc braking presents serious space and cost problems. Further, compensation for brake wear presents an additional problem, wich is aggravated by the large stroke requirements of pneumatic actuators.

In addition, prior devices to compensate for brake wear, and to reset the compensation mechanism, lacked the unusual advantages in structure, function and results achieved by the present invention, and they lacked adaptation to pneumatic actuation in the simple and effective manner as now provided.

SUMMARY OF THE INVENTION

It is a major object of the invention to provide solutions to the above problems, and to overcome disadvantages of prior braking apparatus. The invention enables achievement of high mechanical advantage without increase in size of equipment, enabling provision of relatively small size brakes for use on trucks and other vehicles.

Basically, apparatus incorporating the invention comprises anvil structure to which braking force is transmitted; wedge means having wedging engagement with the anvil structure and shiftable relative to the latter in response to an increase in the extent of brake part advancement due to brake wear; brake force transmitting means including a rotary member having threaded engagement with the wedge means and movable endwise of and within the anvil structure; and yieldable means acting to bias the rotary member to rotate in a direction tending to displace the wedge means for maintenance of interengagement with the anvil structure despite brake wear.

As will be seen, a non-rotary stem may be interposed between the rotary member and brake part, and a brake pad retracting drag ring frictionally attached to that stem to slip relative thereto only when frictional resistance is overcome by stem displacement compensating for brake wear; the rotary member may with unusual advantage comprise a shaft having a thread in engagement with a thread defined by the wedge means, the threads having frusto-conical outlines; dual anvil structures as defined may be carried on a rotary disc straddling caliper, to be actuated by a single pneumatic cylinder via a yoke-shaped lever of high mechanical advantage; and access may be had to the rotary shaft members via the ends of the anvil structures for resetting purposes, as will appear.

These and other objects and advantages of the invention, as well as the details of an illustrative embodiment, will be more fully understood from the following description and drawings, in which:

DRAWING DESCRIPTION

DETAILED DESCRIPTION

Figure 1:
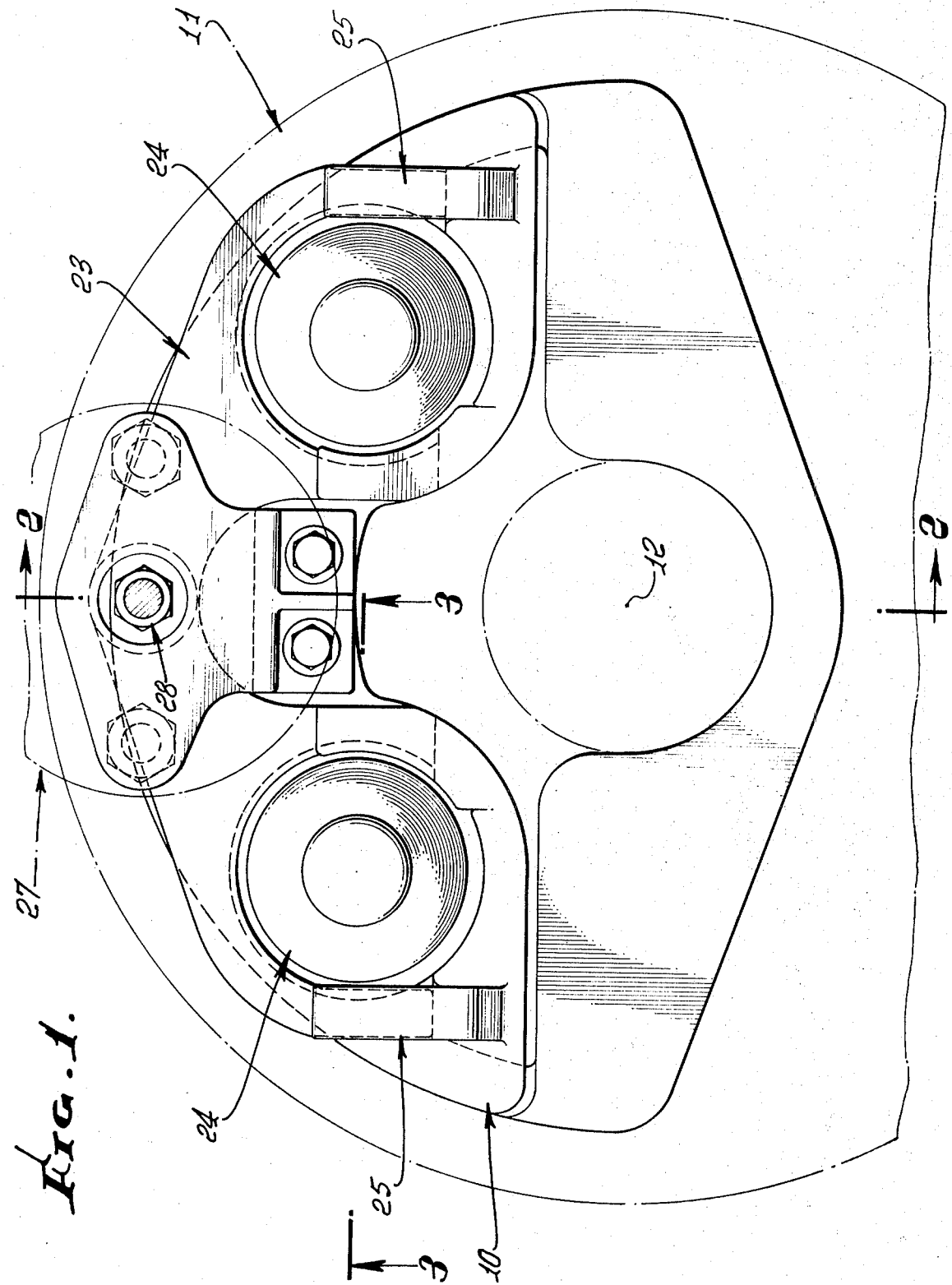
FIG. 1 is an end elevation showing disc brake apparatus incorporating the invention.

In the drawings, a caliper 10 straddles a moving part such as disc 11 rotatable about an axis 12. The disc may have an integral hub 12a suitably attached as at 13 to rotating wheel or axle structure 14, and it is intended that the disc be braked in the manner to be described.

An arcuate braking part or pad 15 is carried by the caliper to face one side 11a of the disc, the pad being supported by a plate 16 the upper extension 16a of which slides on a pin 17 carried by the caliper. Caliper jaw 18 clamps against the plate during braking. Similarly, an arcuate braking part or pad 19 faces the opposite side 11b of the disc and is supported by a plate 20 the upper extension 20a of which slides on pin 17. Braking force is transmitted to plate 20 and pad 19 via an arcuate plate 21, which may be connected to plate 20.

Figure 2:
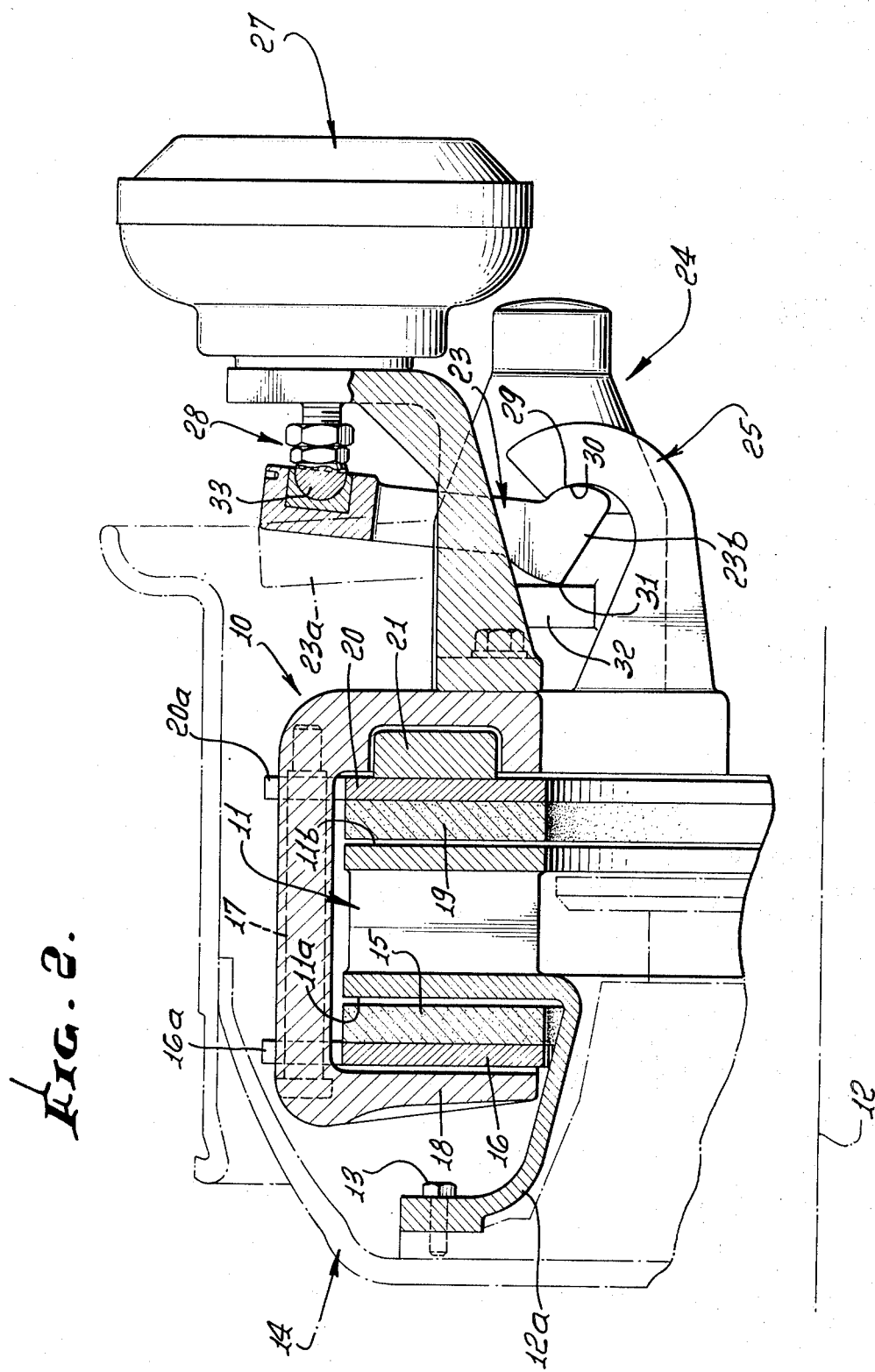
FIG. 2 is a section taken in elevation on lines 2—2 of FIG. 1.

In FIG. 2, braking force is typically applied by lever means, as for example lever 23, which pivots or rocks counterclockwise between the solid line position as shown and the broken line position 23a, thereby to urge anvil structure 24 leftwardly relative to the hook shaped member 25 which is integral with the caliper 10. Extending the description to FIGS. 1 and 3, the lever may with unusual advantage have yoke shape, with arms diverging toward each of two anvil structures 24 located for applying braking force in tandem, via plates 20 and 21 as described. Accordingly, a single actuator, as for example pneumatic actuator 27, may be operated to displace a ram 28 to the left in FIG. 2 for rocking the lever and thereby displacing both anvil structures toward the disc, and relative to the caliper 10. The ram 28 may have universal joint connection with the lever, as at ball joint 33; and the enlarged end portions 23b of each arm of the lever may fulcrum at 29 adjacent the inner concave surfaces 30 of members 25, and exert braking force at the points of engagement 31 with the anvil ears or lugs 32. The construction is such, that a very large mechanical advantage of force transmission is obtained with respect to braking force transmission from the actuator to the anvil structures. Actuator 27 may be suitably attached to the caliper, or the vehicle structure mounting the caliper.

Figure 3:
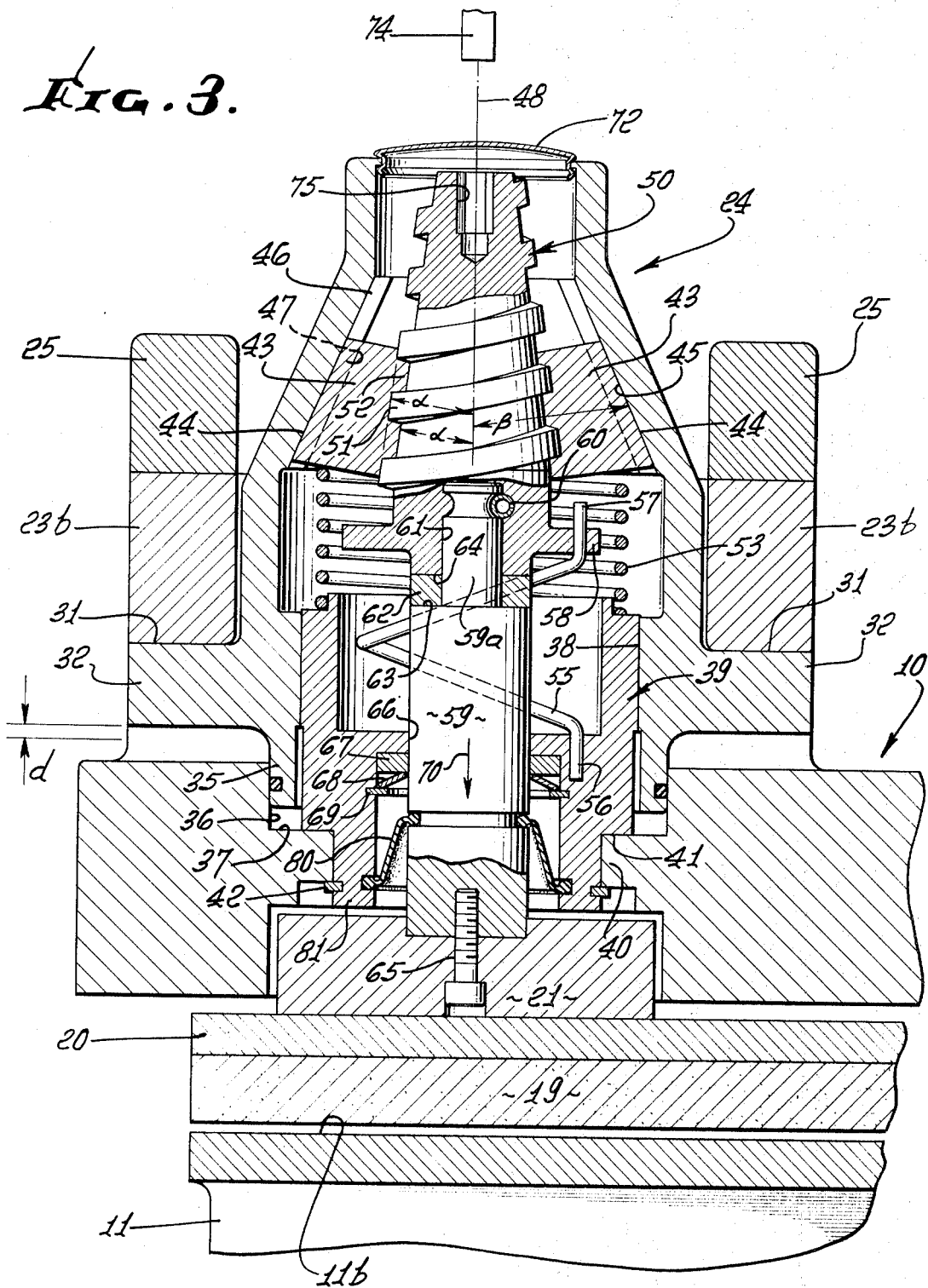
FIG. 3 is a horizontal section taken on lines 3—3 of FIG. 1.

Each anvil structure, as shown in FIG. 3, may have a tubular portion 35 projecting into a bore 36 formed in the caliper, for guiding movement of the anvil relative to the caliper, advancement of the anvil being limited by engagement with stop shoulder 37. The anvil is also slidable at 38 over a tubular guide body 39, which is attached to an internal flange 40 integral with the caliper. For this purpose, opposite faces of the flange engage body shoulder 41 and a snap ring 42 retained on the body.

In accordance with an important aspect of the invention, wedge means is provided, as for example by wedges 43, to have enagement with the anvil structure and to be shiftable relative to the latter in response to an increase in the extent of advancement of brake part or pad 19 toward the disc, due to brake wear. For this purpose, the wedges 43 may have exterior taper at 44 matching the frusto-conical interior wall taper 45 of the anvil structure 24, the wedges and anvil typically having tongue and groove interconnection at 46, and 47. The latter extend lengthwise of and are angled relative to the axis 48 of structure 24 to accommodate such shifting.

Further, brake force transmitting means is provided to receive force transmission via the anvil structure and wedge means for advancing the brake part 19 toward the disc 11. Such brake force transmitting means may advantageously include a rotary member, as for example threaded shaft 50, having threaded engagement with the wedge means and movable endwise relative to the anvil structure. In the example, the frusto-conical angularity $\alpha$ of the shaft, of the outline of the thread 51 and of the outline of the complementary wedge thread 52 is less than the frusto-conical angularity $\beta$ of the inner surface 45 of the anvil structure and of the outer surface of each wedge, whereby wedging interengagement with the anvil structure may be maintained despite axial advancement of the shaft relative to the anvil structure to compensate for wear of brake pads 19. A compression spring 53 acting between body 39 and the wedges 43 urges the latter axially in a retraction direction.

Such maintenance of wedging interengagement assures transmission of braking force from the anvil to the brake pad despite varying conditions of brake wear, the degree of anvil stroking (as for example is illustrated at $d$) remaining relatively small, as composed for example with the initial thickness of the wearable brake pad 19.

Yieldable means is also provided acting to bias the rotary member, i.e., shaft 50 for example, to rotate in a direction tending to relatively displace the wedge means for maintenace of wedging interengagement or coupling with the anvil structure as well as the member 50. Compression spring 53 adds in maintaining such intercoupling. Such yieldable means may comprise a torsion spring 55 one end 56 of which is fixed as for example to body 39, and the other end 57 to which is attached eccentrically to the lug 58 integral with shaft 50. In this regard, the brake force transmitting means may include a non-rotary stem 59 to the upper projection 59a of which the shaft 50 is rotatably coupled as via spring pin 60, the shaft bore 61 receiving projection 59a. A thrust washer 62 is located between stem face 63 and the shaft end face 64. Stem 59 also has rigid connection to plate 21, as via fastener 65.

Finally, the body 39 may be considered as a carrier for the stem 59, the latter extending through a guide bore 66 in body 39. As seen in FIG. 3, a drag part or ring 67 is operatively carried by the stem to frictionally resist displacement therealong, and a Belleville spring 68 retained on the carrier by retainer ring 69 yieldably resists drag ring displacement with the stem in the advancement direction 70. As the brake pad 19 continues to wear, such frictional resistance is overcome by stem displacement compensating for brake wear. Belleville spring 68 retracts the stem 59, brake pad 19 and anvil structure, as by stroke distance $d$, upon each release of brake force transmission via the lever means 23.

When a new brake pad 19 is subsituted, the brake structure may be very easily reset, as by removing dust seal 72 and rotating the shaft 50 to travel the wedges back to the approximate positions shown in FIG. 3, this operation also winding the torsion spring 55. For this purpose, a re-set tool, as for example a screw driver 74, may be inserted into the recessed end of 75 of shaft 50, and rotated.

A dust seal 80 seals off between shaft 59 and the body boss 81, as shown.

In a braking operation, the actuator 27 effects rocking of lever 23, which urges the anvil 24 toward disc 11. As the anvil 24 and wedges 43 are thus advanced, brake part 19 is advanced by the force transmitting means that includes rotary shaft member 50 and stem 59. In this regard, torsion spring 55 tends to rotate the shaft member 50 in a direction tending to keep the wedges engaged with the anvil tapered surface 45, and compression spring 53 assists in urging the wedges toward that surface. The belleville washer 68 is energized by the drag ring 67 as the stem 59 advances toward the disc, and serves to retract the intercoupled stem 59 shaft 50, wedges 43 and anvil 24, on each release of the brake. As the brake pad 19 wears, shaft 50 and stem 59 are advanced as accommodated by torsion spring induced rotation of shaft 50 relative to the wedges and by frictional slippage of stem 59 relative to the drag ring 67.

I claim:

1. For use in a brake assembly operable to advance a brake part into braking engagement with a rotary disc, and operable to compensate for brake part wear, the combination comprising
   a. anvil structure to which braking force is transmitted,
   b. wedge means having wedging engagement with said anvil structure and shiftable relative thereto in response to an increase in the extent of said advancement due to brake wear,
   c. brake force transmitting means to receive force transmission via the anvil structure and said wedging means for so advancing said brake part, and including a rotary member having threaded engagement with the wedge means and movable endwise relative to the anvil structure, and
   d. yieldable means acting to bias the rotary member to rotate in one rotary direction tending to relatively displace the wedge means for maintenance of said wedging interengagement with the anvil structure.

2. The combination of claim 1 wherein said brake force transmitting means includes a non-rotary stem connected with the brake part and having rotary coupling with said rotary member.

3. The combination of claim 2 including a carrier body extending about the stem, a drag part operatively carried by the stem to frictionally resist relative displacement therealong, a spring carried by the carrier to yieldably resist drag part displacement with the stem in said advancement direction, said frictional resistance being overcome by stem displacement compensating for brake part wear.

4. The combination of claim 1 including lever meas operatively connected with the anvil structure to displace same in said advancement direction in response to lever pivoting.

5. The combination of claim 4 wherein said lever means includes lever ends extending at opposite sides of the anvil structure.

6. The combination of claim 4 including a pneumatic actuator operatively connected with said lever means for pivoting same.

7. The combination of claim 1 including said brake part and said moving part in the form of a rotary disc.

8. The combination of claim 1 including a caliper body carrying said anvil structure, wedge means, brake force transmitting means and yieldable means.

9. The combination of claim 1 wherein said anvil structure is generally tubular and has a frusto-conical section containing said wedge means, said rotary member extending substantially coaxially within said frusto-conical section.

10. The combination of claim 2 wherein said yieldable means comprises a torsion spring one end of which is operatively anchored to said rotary member, there being a carrier receiving said stem and the opposite end of the torsion spring being operatively anchored to the carrier.

11. Dual combinations as defined in claim 1 and a caliper body carrying said dual combinations in spaced relation to exert braking force on said brake part.

12. The invention as defined in claim 11 including a pneumatic actuator, and yoke shaped lever means operatively connected between said actuator and the dual anvil structures.

13. The combination of claim 1 wherein the rotary member comprises a shaft having a thread in engagement with a thread defined by the wedge means, said threads having frusto-conical outlines.

14. The combination of claim 1 including a compression spring transmitting retracting force to the wedge means.

15. The combination of claim 10 wherein the shaft has an end coupling accessible through the anvil structure for reception of a reset tool operable to rotate the shaft in the opposite rotary direction.

16. The combination of claim 4 wherein the anvil structure houses the wedge means and includes external lugs engageable by enlarged end portions of the lever means.

* * * * *